(12) United States Patent
Perez-Espartero et al.

(10) Patent No.: US 11,123,885 B1
(45) Date of Patent: Sep. 21, 2021

(54) MULTI-FUNCTION KITCHEN KNIFE SYSTEM

(71) Applicants: Martha Perez-Espartero, Newberry, FL (US); Nestor Espartero, Newberry, FL (US)

(72) Inventors: Martha Perez-Espartero, Newberry, FL (US); Nestor Espartero, Newberry, FL (US)

( * ) Notice: Subject to any disclaimer, the term of this patent is extended or adjusted under 35 U.S.C. 154(b) by 0 days.

(21) Appl. No.: 15/625,656

(22) Filed: Jun. 16, 2017

(51) Int. Cl.
| | |
|---|---|
| *B26B 11/00* | (2006.01) |
| *B26B 27/00* | (2006.01) |
| *B25G 1/08* | (2006.01) |
| *A22C 25/02* | (2006.01) |
| *B67B 7/16* | (2006.01) |
| *B67B 7/04* | (2006.01) |
| *A47J 17/02* | (2006.01) |
| *B26B 9/00* | (2006.01) |

(52) U.S. Cl.
CPC .......... *B26B 11/006* (2013.01); *A22C 25/025* (2013.01); *A47J 17/02* (2013.01); *B25G 1/08* (2013.01); *B26B 9/00* (2013.01); *B26B 27/002* (2013.01); *B67B 7/0411* (2013.01); *B67B 7/16* (2013.01)

(58) Field of Classification Search
CPC ....... B26B 11/006; B26B 9/00; B26B 27/002; A22C 25/025; A67J 17/02; B25G 1/08; B67B 7/0411; B67B 7/16
See application file for complete search history.

(56) References Cited

U.S. PATENT DOCUMENTS

| | | | | |
|---|---|---|---|---|
| 24,099 | A * | 5/1859 | Carrier | B26B 3/03 30/284 |
| 1,470,147 | A * | 10/1923 | Clawson | B26B 3/03 30/284 |
| 1,697,974 | A * | 1/1929 | Funk | B67B 7/44 7/152 |
| 1,788,656 | A * | 1/1931 | Brown | B26B 11/006 7/106 |
| 2,041,596 | A * | 5/1936 | Cralley | A47J 17/02 30/279.6 |
| 2,533,682 | A * | 12/1950 | Nelson | B26B 27/002 30/116 |
| 2,829,434 | A * | 4/1958 | Schweikert | B26B 27/002 30/116 |
| 3,590,424 | A * | 7/1971 | Shults | A22C 25/025 452/101 |
| 4,638,561 | A * | 1/1987 | Koike | B26B 3/03 30/284 |
| 4,970,785 | A * | 11/1990 | Collins | B26B 5/00 30/123 |
| 5,802,723 | A * | 9/1998 | Haggar | B26B 3/03 30/283 |
| 8,464,382 | B2 * | 6/2013 | Chu | B26B 1/042 7/118 |
| 2012/0222312 | A1 * | 9/2012 | Bordas | A47J 17/02 30/123.6 |

* cited by examiner

*Primary Examiner* — David B. Thomas
(74) *Attorney, Agent, or Firm* — Lewellyn Law, PLLC; Stephen Lewellyn

(57) ABSTRACT

A knife has a blade with a tip forwardly, a tang rearwardly, a spine upwardly, and an edge downwardly. A handle encompassing the spine. A plurality of components, including a cheese slicer, are formed in the blade along the spine.

12 Claims, 3 Drawing Sheets

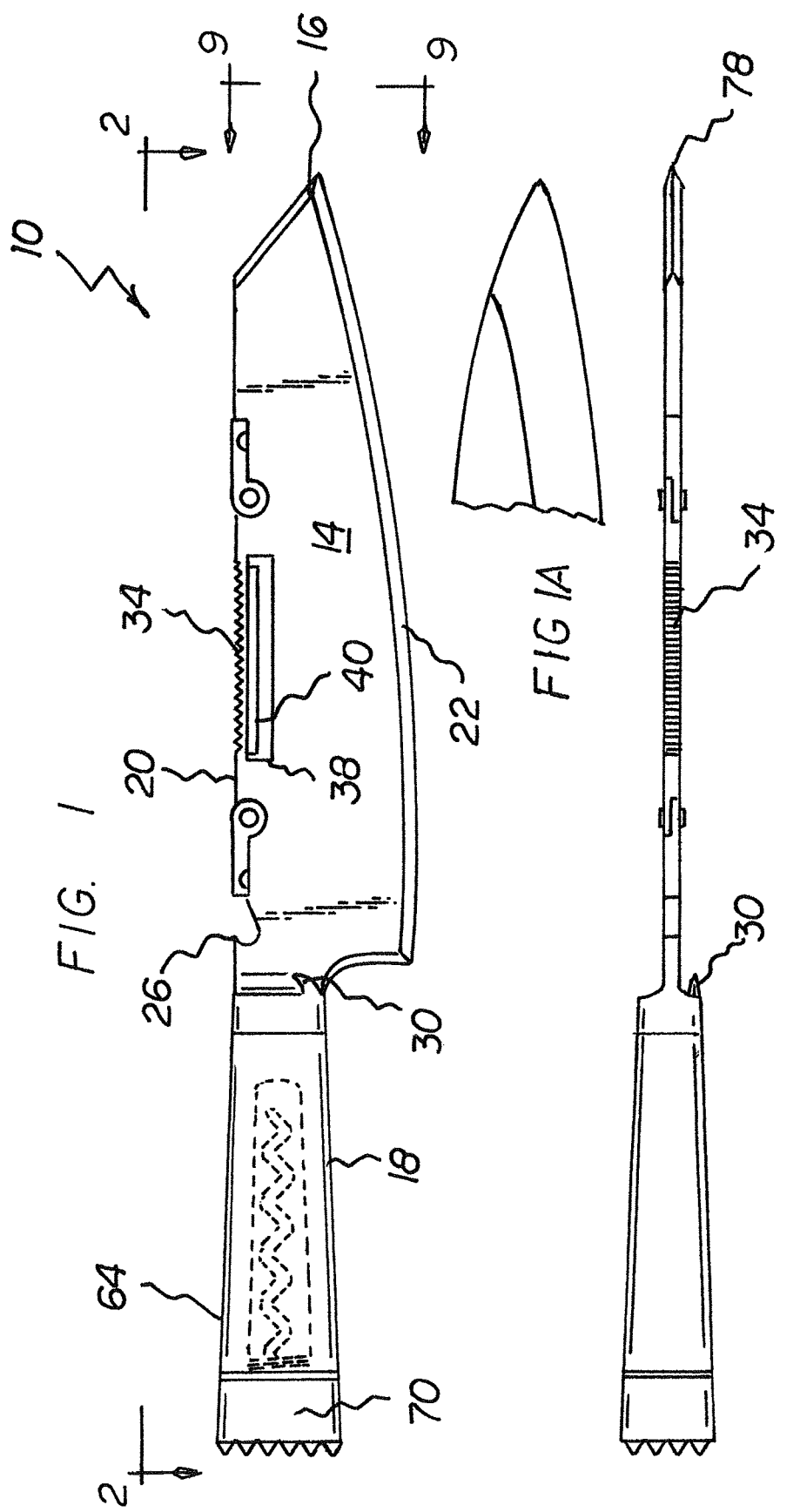

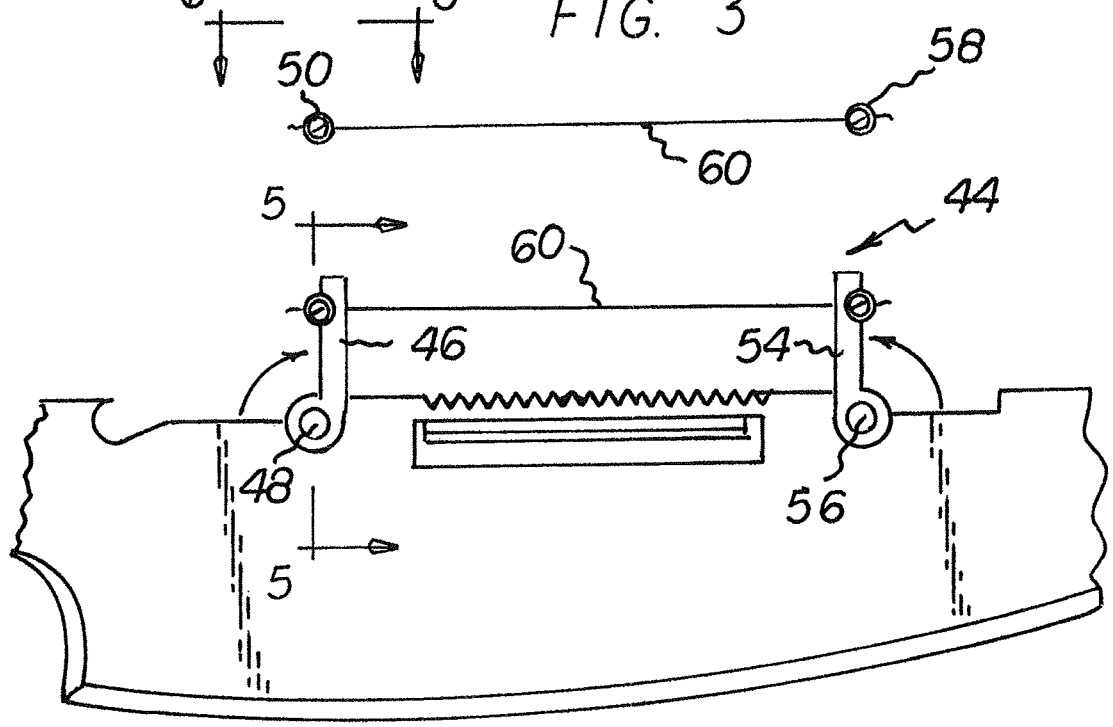
FIG. 3
FIG. 4
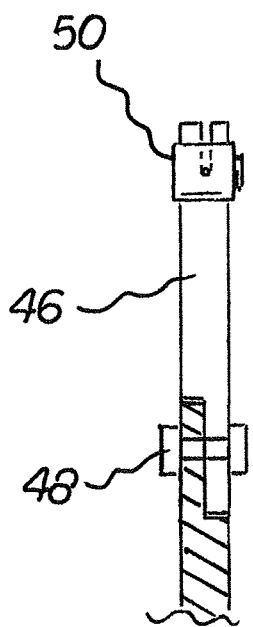
FIG. 5
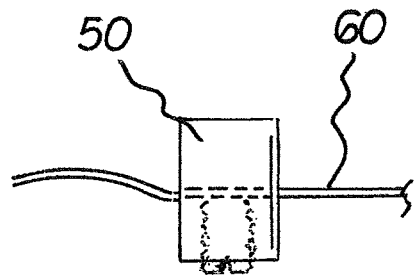
FIG. 6

MULTI-FUNCTION KITCHEN KNIFE SYSTEM

BACKGROUND OF THE INVENTION

Field of the Invention

The present invention relates to a multi-function kitchen knife system and more particularly pertains to performing a large number of kitchen tasks with a single system.

Description of the Prior Art

The use of knives and kitchen tools is known in the prior art. More specifically, knives and kitchen tools previously devised and utilized for the purpose of performing specific tasks are known to consist basically of familiar, expected, and obvious structural configurations, notwithstanding the myriad of designs encompassed by the crowded prior art which has been developed for the fulfillment of countless objectives and requirements.

While these tools fulfill their respective, particular objectives and requirements, they do not describe a multi function kitchen knife system that allows performing a large number of kitchen tasks with a single system.

In this respect, the multi-function kitchen knife system according to the present invention substantially departs from the conventional concepts and designs of the prior art, and in doing so provides an apparatus primarily developed for the purpose of performing a large number of kitchen tasks with a single system.

Therefore, it can be appreciated that there exists a continuing need for a new and improved multi-function kitchen knife system which can be used for performing a large number of kitchen tasks with a single system. In this regard, the present invention substantially fulfills this need.

SUMMARY OF THE INVENTION

In view of the disadvantages inherent in the known types of knives and kitchen tools now present in the prior art, the present invention provides an improved multi-function kitchen knife system. As such, the general purpose of the present invention, which will be described subsequently in greater detail, is to provide a new and improved multi-function kitchen knife system and method which has all the advantages of the prior art and none of the disadvantages.

To attain this, from a broad perspective, the present invention essentially comprises a system for performing a large number of kitchen tasks with a single system. The system includes a blade having a tip forwardly, a tang rearwardly, a spine upwardly, and an edge downwardly. The system also includes a handle encompassing the spine. The system also includes a plurality of components formed in the blade along the spine.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention.

It is important, therefore, that the claims be regarded as including such equivalent constructions insofar as they do not depart from the spirit and scope of the present invention.

It is therefore an object of the present invention to provide a new and improved multi-function kitchen knife system which has all of the advantages of the prior art knives and kitchen tools and none of the disadvantages.

It is another object of the present invention to provide a new and improved multi-function kitchen knife system which may be easily and efficiently manufactured and marketed.

It is a further object of the present invention to provide a new and improved multi-function kitchen knife system which is of durable and reliable constructions.

An even further object of the present invention is to provide a new and improved multi-function kitchen knife system which is susceptible of a low cost of manufacture with regard to both materials and labor, and which accordingly is then susceptible of low prices of sale to the consuming public, thereby making such multi-function kitchen knife system economically available to the buying public.

Lastly, it is an object of the present invention to provide a multi-function kitchen knife system for performing a large number of kitchen tasks with a single system.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a multi-function kitchen knife constructed in accordance with the principles of the present invention.

FIG. 1A is a front elevational view of a deep two-sided cutting edge.

FIG. 2 is a plan view taken along line 2-2 of FIG. 1 and showing a shallow two-sided cutting edge.

FIG. 3 is a plan view of the cheese slicer in an operative orientation.

FIG. 4 is a front elevational view of a central extent of the multi-function kitchen knife system.

FIG. 5 is a side elevational view taken along line 5-5 of FIG. 4.

FIG. 6 is a plan view taken along line 6-6 of FIG. 4.

The same reference numerals refer to the same parts throughout the various Figures.

DESCRIPTION OF THE PREFERRED EMBODIMENT

Figure 7:
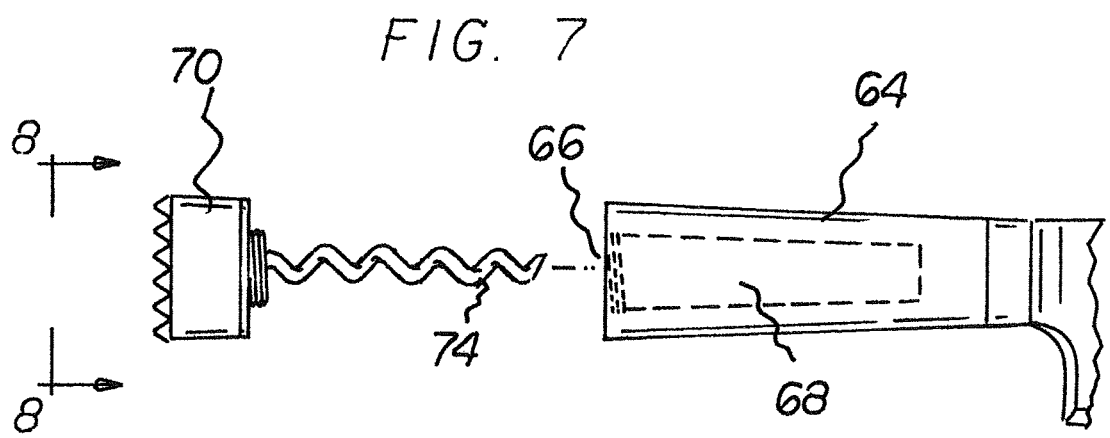
FIG. 7 is an exploded front elevational view of the handle and end cap.
Figure 8:
FIG. 8 is an end elevational view taken along line 8-8 of FIG. 7.

With reference now to the drawings, and in particular to FIG. 1 thereof, the preferred embodiment of the new and improved multi-function kitchen knife system embodying the principles and concepts of the present invention and generally designated by the reference numeral 10 will be described.

The present invention, the multi-function kitchen knife system 10 includes a blade, a handle, and a plurality of components formed in the blade. Such components are individually configured and correlated with respect to each other so as to attain the desired objective.

From a specific perspective, the invention of the present application is a multi-function kitchen knife system 10 for cutting and for performing a wide variety of kitchen-related tasks and functions. The cutting and the performing are done in a safe, convenient, and economical manner. The system includes a blade 14 having a tip 16 forwardly, a tang 18 rearwardly, a spine 20 upwardly, and an edge 22 downwardly. The blade is preferably fabricated of high carbon stainless steel.

A bottle opener 26 is formed in the blade adjacent to the tang.

A can opener 30 is formed in the spine adjacent to the blade.

An undulating edge 34 is formed in a central extent of the spine. The undulating edge functions for scaling fish.

A slot 38 is formed with a downwardly facing sharp edge 40 functioning as a vegetable peeler. The slot and the sharp edge are parallel with and located downwardly of the undulating edge.

A cheese slicer 44 is provided having a rearward anchor 46. The rearward anchor has a lower end with a pivot pin 48. The rearward anchor has an upper end with an axial slot 50. The pivot pin is adjacent to and rearwardly of the undulating edge. The upper end is movable between an inoperative position adjacent to the bottle opener and an operative position above the pivot pin. The cheese slicer 44 has a forward anchor 54. The forward anchor has a lower end with a pivot pin 56. The forward anchor has an upper end with an axial slot 58. The pivot pin is adjacent to and forwardly of the undulating edge. The upper end is movable between an inoperative position adjacent to the tip and an operative position above the pivot pin. The cheese slicer 44 has a string 60 with ends supported by the axial slots of the forward and rearward anchors.

A handle 64 encompasses the tang. The handle has a free end 66 with a cylindrical recess 68. The handle has an end cap 70 threadedly couplable to the free end with a spiral cork puller 74 extending from the end cap and positionable within the recess.

Figure 9:
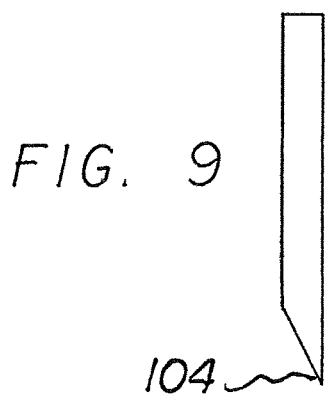
FIG. 9 is a side elevational view of the shallow one-sided cutting edge of the prior Figures.
Figure 10:
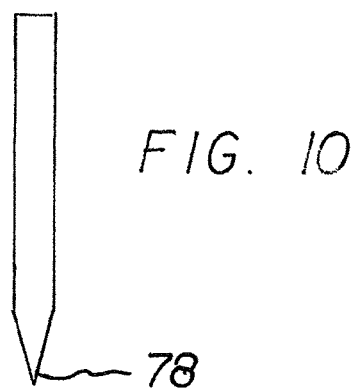
FIG. 10 is a side elevational view of a shallow two-sided cutting edge constructed in accordance with an alternate embodiment of the invention.
Figure 11:
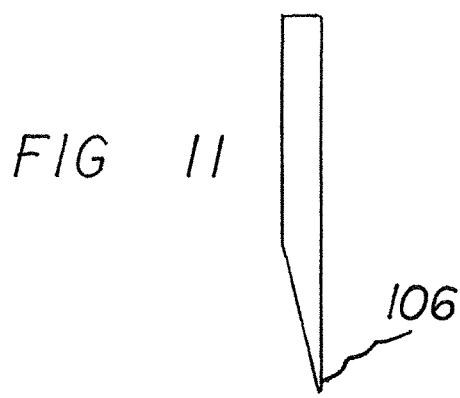
FIG. 11 is a side elevational view of a deep one-sided cutting edge constructed in accordance with an alternate embodiment of the invention.

Lastly, a cutting edge 78 is formed in the blade along the edge and along the tip. Various types of cutting edges may be formed in the blade. FIG. 9, for example, shows a side elevational view of the shallow one-sided cutting edge 104. FIG. 10, as well as FIGS. 1 and 2, show a side elevational view of a shallow two-sided cutting edge 78. FIG. 11 shows a side elevational view of a deep one-sided cutting edge 106.

Figure 12:
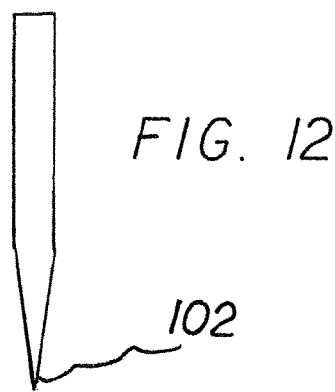
FIG. 12 is a side elevational view of a deep two-sided cutting edge constructed in accordance with an alternate embodiment of the invention.

FIG. 12, as well as FIG. 1A, shows a side elevational view of a deep two-sided cutting edge 102.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-function kitchen knife system for performing a large number of kitchen tasks with a single system, the system comprising, in combination:

a blade having a tip forwardly, and a tang rearwardly, and a spine upwardly, and an edge downwardly;

a handle encompassing the spine; and a plurality of components formed in the blade along the spine, the components including a cheese slicer.

2. The system as set forth in claim 1 wherein the plurality of components includes:

a bottle opener formed in the blade adjacent to the tang.

3. The system as set forth in claim 1 wherein the plurality of components includes:

a can opener formed in the spine adjacent to the blade.

4. The system as set forth in claim 1 wherein the plurality of components includes:

an undulating edge formed in a central extent of the spine functioning for scaling fish.

5. The system as set forth in claim 1 wherein the plurality of components includes:

a slot with a downwardly facing sharp edge functioning as a vegetable peeler, the slot and the sharp edge being parallel with and located downwardly of the undulating edge.

6. The system as set forth in claim 1 wherein the cheese slicer has a rearward anchor, the rearward anchor having a lower end with a pivot pin, the rearward anchor having an upper end with an axial slot, the pivot pin being adjacent to and rearwardly of the undulating edge, the upper end being movable between an inoperative position adjacent to the bottle opener and an operative position above the pivot pin, the cheese slicer having a forward anchor, the forward anchor having a lower end with a pivot pin, the forward anchor having an upper end with an axial slot, the pivot pin being adjacent to and forwardly of the undulating edge, the upper end being movable between an inoperative position adjacent to the tip and an operative position above the pivot pin, the cheese slicer having a string 60 with ends supported by the axial slots of the forward and rearward anchors.

7. The system as set forth in claim 1 wherein the plurality of components includes:
  a handle encompassing the tang, the handle having a free end with a cylindrical recess, the handle having an end cap threadedly couplable to the free end with a spiral cork puller extending from the end cap and positionable within the recess.

8. The system as set forth in claim 1 wherein the plurality of components includes:
  a shallow one-sided cutting edge along the edge and along the tip.

9. The system as set forth in claim 1 wherein the plurality of components includes:
  a deep two-sided cutting edge along the edge and along the tip.

10. The system as set forth in claim 1 wherein the plurality of components includes:
  a deep one-sided cutting edge along the edge and along the tip.

11. The system as set forth in claim 1 wherein the plurality of components includes:
  a shallow two-sided cutting edge along the edge and along the tip.

12. A multi-function kitchen knife system (10) for cutting and for performing a wide variety of kitchen-related functions, the system comprising, in combination:
  a blade (14) having a tip (16) forwardly, and a tang (18) rearwardly, and a spine (20) upwardly, and an edge (22) downwardly, the blade being fabricated of high carbon stainless steel;
  a bottle opener (26) formed in the blade adjacent to the tang;
  a can opener (30) formed in the spine adjacent to the blade;
  an undulating edge (34) formed in a central extent of the spine functioning for scaling fish;
  a slot (38) with a downwardly facing sharp edge (40) functioning as a vegetable peeler, the slot and the sharp edge being parallel with and located downwardly of the undulating edge;
  a cheese slicer (44) having a rearward anchor (46), the rearward anchor having a lower end with a pivot pin (48), the rearward anchor having an upper end with an axial slot (50), the pivot pin being adjacent to and rearwardly of the undulating edge, the upper end being movable between an inoperative position adjacent to the bottle opener and an operative position above the pivot pin, the cheese slicer (44) having a forward anchor (54), the forward anchor having a lower end with a pivot pin (56), the forward anchor having an upper end with an axial slot (58), the pivot pin being adjacent to and forwardly of the undulating edge, the upper end being movable between an inoperative position adjacent to the tip and an operative position above the pivot pin, the cheese slicer (44) having a string (60) with ends supported by the axial slots of the forward and rearward anchors;
  a handle (64) encompassing the tang, the handle having a free end (66) with a cylindrical recess (68), the handle having an end cap (70) threadedly couplable to the free end with a spiral cork puller (74) extending from the end cap and positionable within the recess; and
  a cutting edge (78) along the edge and along the tip.

\* \* \* \* \*